United States Patent [19]

Bendall

[11] 4,005,609
[45] Feb. 1, 1977

[54] AUTOMATIC VARIABLE SPEED TRANSMISSION

[76] Inventor: Wilfrid H. Bendall, 12 Castle Hill Road, Pawcatuck, Conn. 02891

[22] Filed: Jan. 19, 1976

[21] Appl. No.: 650,167

[52] U.S. Cl. .................. 74/230.17 S; 74/230.17 A; 74/230.17 M

[51] Int. Cl.² .................. F16H 55/52; F16H 55/56; F16H 13/02

[58] Field of Search .......... 74/230.17 S, 230.17 M, 74/230.17 A

[56] References Cited

UNITED STATES PATENTS

| | | | |
|---|---|---|---|
| 765,819 | 7/1904 | Cutter | 74/230.17 S |
| 803,810 | 11/1905 | Cutter | 74/230.17 S |
| 803,811 | 11/1905 | Cutter | 74/230.17 S |
| 2,378,375 | 6/1945 | Abbott | 74/230.17 A |
| 2,805,583 | 9/1957 | Besel | 74/230.17 A |
| 2,852,953 | 9/1958 | Karig | 74/230.17 M |
| 3,016,755 | 1/1962 | Dittrich | 74/230.17 S |
| 3,490,301 | 1/1970 | Steuer | 74/230.17 A |

Primary Examiner—Benjamin W. Wyche
Assistant Examiner—A. Russell Burke

[57] ABSTRACT

An automatic transmission using a drive chain having traction members engaging axially opposed pairs of conical discs on parallel input and output shafts. One of each pair of discs is provided with torque responsive elements for varying the chain engagement pitch diameter in response to varying input and output torques. The chain traction members are shaped to collect and wedge a lubricating film at the disc contacts. When starting under load the chain initially is in limited contact with the discs on the output shaft and functions as a gradual engagement clutch.

9 Claims, 6 Drawing Figures

AUTOMATIC VARIABLE SPEED TRANSMISSION

SUMMARY OF THE INVENTION

This invention relates generally to continuously variable speed transmissions having opposed pairs of conical drive discs on parallel input and output shafts interconnected by a chain or belt and more particularly to such a transmission having automatic engagement and torque responsive means adapting it for automotive use.

Transmissions of this class, in principle, are well known in the art and have considerable industrial use. Generally, however, where substantial power transmission capacity in compact form is sought, their bulk, weight and complexity have precluded their use for automotive purposes.

The contemporary energy crisis has stimulated realization that a practical continuously variable speed automatic transmission would, added to pending improvements in engine efficiency, result in very substantial energy savings. Accordingly, a primary object of the present invention is to provide such a transmission of simple, compact, low cost manufacture and high operating efficiency. Another object is to embody drive chain interconnecting means for such a transmission to enable lubricated traction between the drive discs without metal to metal wear and frictional heating. A further important object is to provide integral, smoothly graduated engagement of the chain with the drive discs, obviating the need for a friction clutch. These and other objects and advantages of the transmission of this invention will be ascertainable to those knowledgeable in the art following reference to the accompanying description, drawings and claims of this specification.

THE DRAWINGS

DETAILED DESCRIPTION

Figure 1:
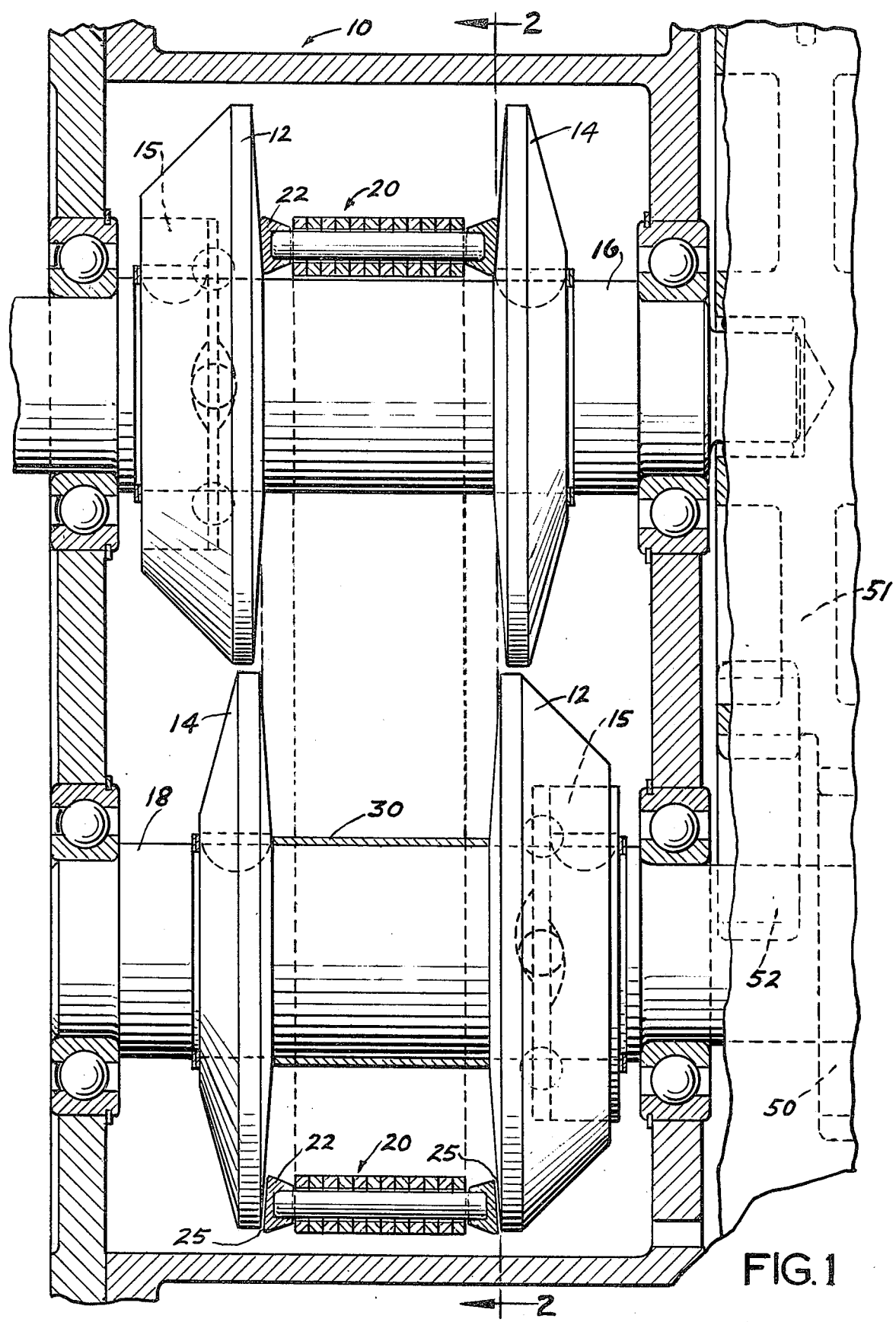
FIG. 1 is a partly diagrammatic longitudinal sectional view of the transmission of this invention.

In FIG. 1, numeral 10 designates a housing containing lubricant and having axially opposed pairs of conical drive discs 12, 14, of variable pitch diameter mounted respectively on drive shaft 16 and parallel driven shaft 18. The discs are interconnected by a loosely pin-jointed chain 20 having traction members 22 on extended ends of chain joint pins 24 for engaging the drive discs. The traction members have tapered hub portions 23 which assemble with a light press fit on the ends of the pins and have an internally conical traction surface 26 adapted to collect and wedge the lubricant between coacting traction and drive disc surfaces. Shaped thus the traction members are well adapted to generate an elastohydrodynamic traction film able to support high axial traction pressures without metal to metal frictional contact. Traction members 22 are maintained in alignment relative to each other by coacting edge portions 28, which serve the additional purpose of limiting chain back-bend and vibration.

One disc of each of the opposed pairs is movable relative to the other. In FIG. 1, discs 14 are keyed to the shafts and axially fixed while discs 12 are axially movable relative to discs 14. Each disc 12 is recessed to enclose an axially fixed reaction member 15, keyed to the shaft and having cam actuated bearing balls engaging opposed recesses in the disc and reaction member. As is well known in the art, this arrangement in principle is a commonly used method of obtaining a torque responsive mounting for drive members. In the present invention it is utilized to make both input and output discs pairs automatically responsive to the driving and resisting torques whereby the the disc movements and and axial pressures vary the chain engagement pitch diameter with the discs to balance opposing torques.

Figure 2:
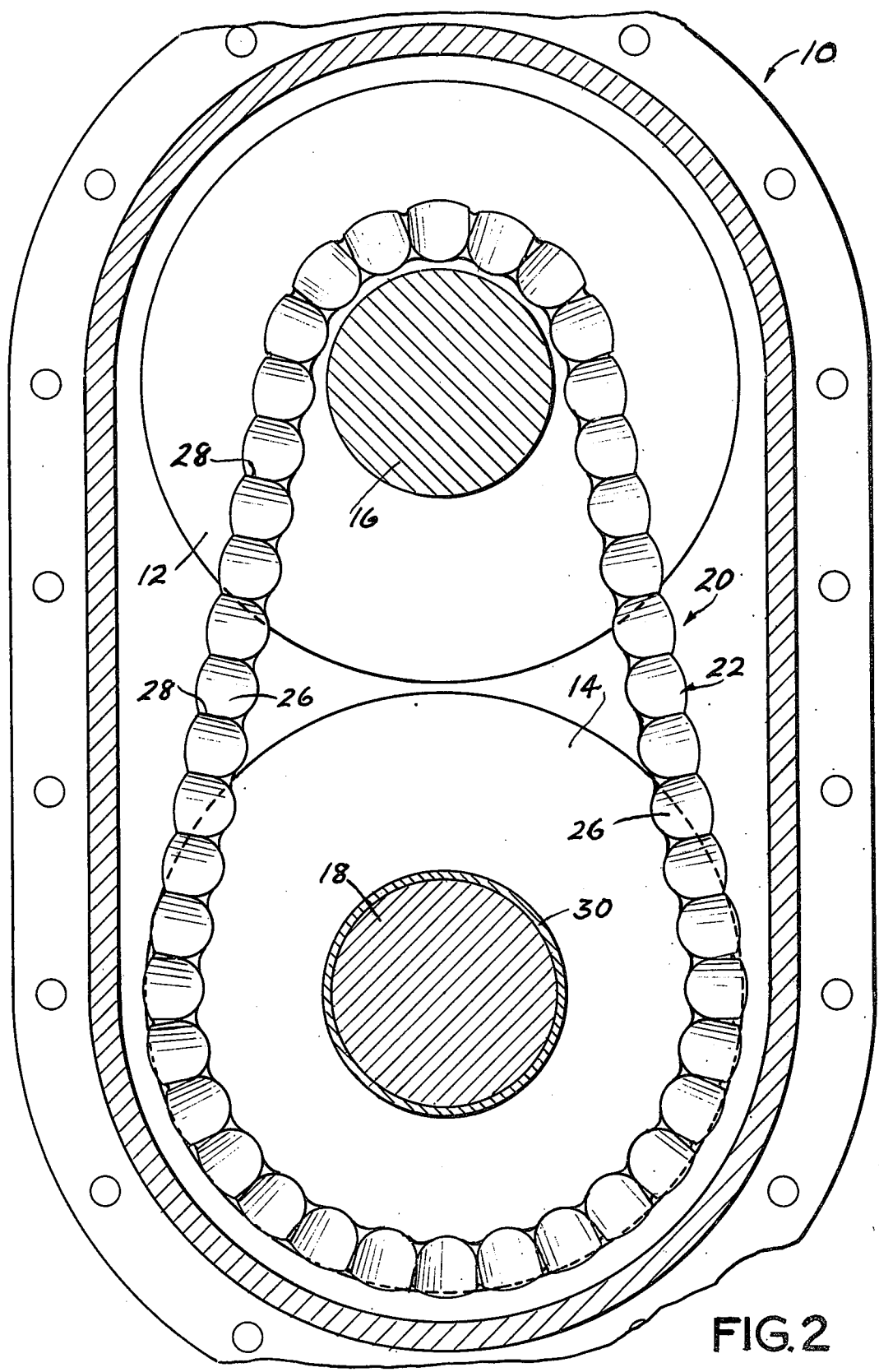
FIG. 2 is a transverse sectional view on the line 2—2 of FIG. 1.

An important requirement for a transmission of this type is for means enabling repeated starting under load with fast, smoothly graduated acceleration to the desired drive condition. This is effected in the transmission of the present invention by utilizing the chain to provide the essential "clutch" function. In the relative positions shown in FIGS. 1 and 2 the transmission components are in the normal starting position. The traction members of the chain portion engaged by the discs on input shaft 16 are in driving contact therewith while the portion adjacent to the discs on driven shaft 18 are separated from contact with the latter by clearances 25, 25. It will be understood that the discs and adjacent chain portions on the driven shaft are submerged in a lubricating medium.

Ensuing rotation of the chain by the drive shaft, in effect, tightens it and reduces the clearances 25, compressing the lubricant on the coacting disc and traction surfaces to the thickness and pressure required to establish traction with the driven discs. Engagement is thereby accomplished with a minimum of frictional contact, heating and wear. It should be noted that the discs on the driven shaft 18 are shown in the maximum axially separated position, to which they normally revert in response to a resisting torque on the driven shaft during the transmission stationary, neutral, engine idling, and starting phases. In these phases the discs are held out of contact with the chain by sleeve member 30 and the chain is thus limited from traction with the driven discs until rotation of the drive discs and chain establishes engagement as described in the foregoing. For this purpose, also, the installed chain length may initially be longer than required for wedged engagement with both pairs of discs during the above listed phases.

Figure 3:
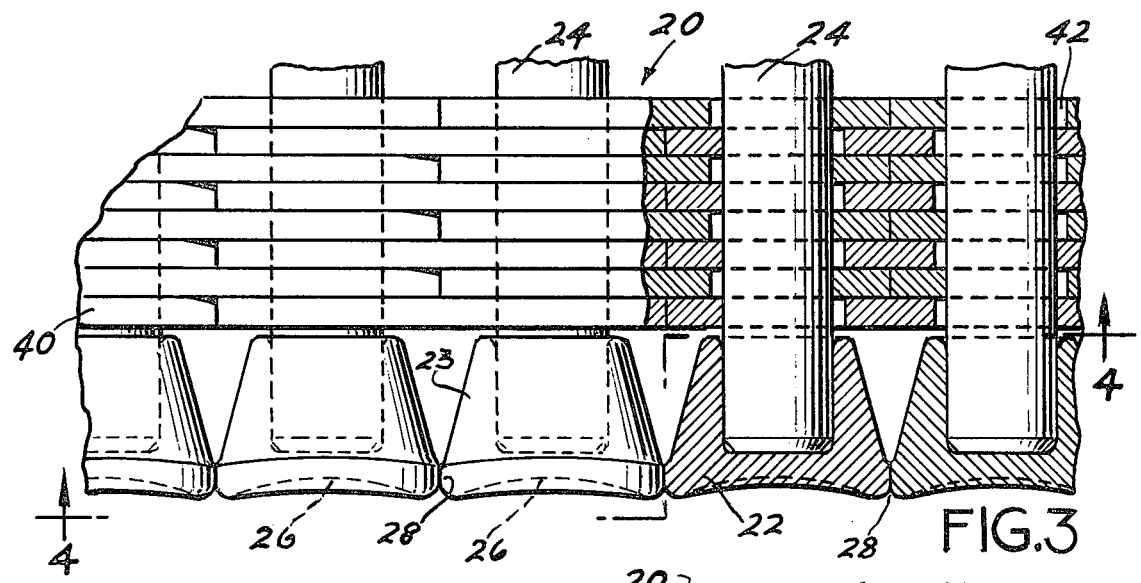
FIG. 3 is a partly sectioned plan view of a portion of the traction chain of this transmission.
Figure 4:
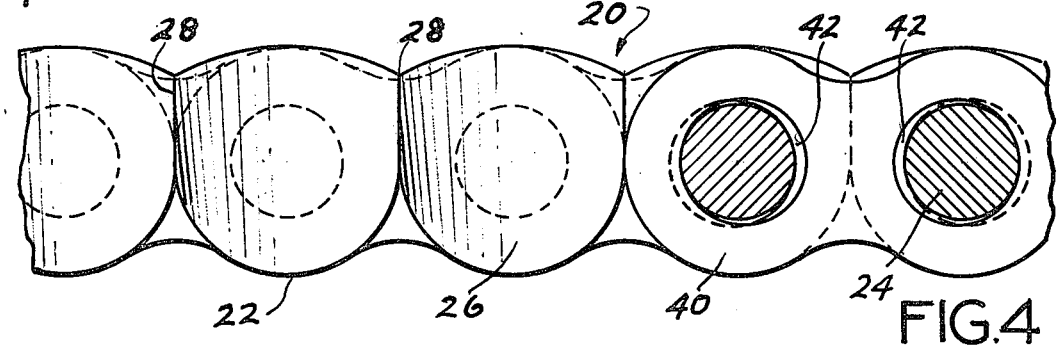
FIG. 4 is a partly sectioned side view of the chain on the line 4—4 of FIG. 3.

A basic requirement for a transmission of this type is for chain linkage capable of transmitting the tractive force over a wide range of speeds and loads with minimum friction and wear. The ordinary bushed-pin joint chains are known to be extremely difficult to lubricate at and above definite limiting speeds and loads, while the more efficient segmental rocker-joint chains do not appear to be conveniently adapted for attachment of suitable traction means. The chain 20, of the present invention, particularly as shown in FIGS. 3 and 4, accordingly embodies link members 40 having bearing pin apertures 42 substantially larger in internal diameter than the outside diameter of the pins 24 so that the links have an internally tangential bearing contact therewith and articulate with a relatively frictionless, easily lubricated, rocking bearing action.

This chain construction conveys the operating advantage of a substantial degree of self-alignment of the individual pin and traction member assemblies independently of the chain longitudinal alignment and the disc alignments. The enlarged pin apertures 40 allow a degree of freedom to these assemblies to move laterally and angularly relative to the disc and shaft alignments and deflections. The chain pins also are relatively free to deflect elastically under disc axial pressures and normal inclinations of the disc surfaces.

Figure 5:
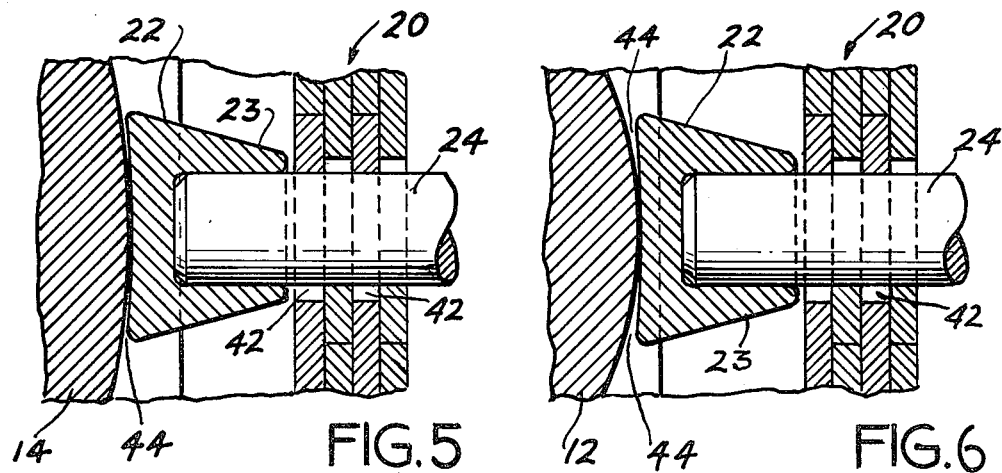
FIG. 5 is a diagrammatic partial plan view of the chain traction member engagement contact with a drive disc at a specific drive pitch diameter.
Figure 6:
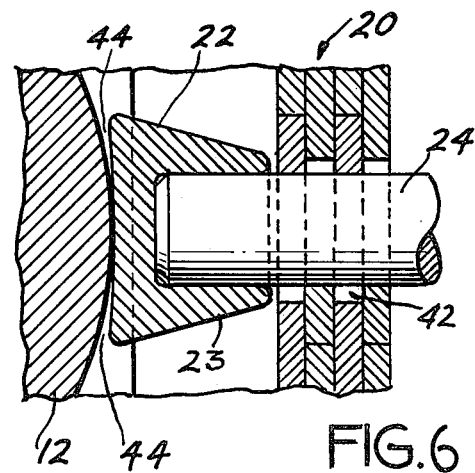
FIG. 6 is a similarly sectioned partial plan view of the traction member engagement with a drive disc at a different specific drive pitch diameter.

FIGS. 5 and 6, respectively, illustrate the coacting disc and traction member surface contacts at the approximate maximum and minimum engagement pitch diameters. The internally conical surface 26 of the traction members if of slightly greater mean radius than the maximum disc pitch diameter it is required to engage. FIG. 5 shows the comparatively large, moderate pressure area of chain and disc contact at the pitch diameter utilized for the "clutch" function. FIG. 6 shows the smaller, higher pressure contact area at the initial drive pitch diameter. In both cases the facility for effectively wedging the lubricant between the traction members and drive discs is indicated by the convergence 44 of their coacting engagement surfaces.

As will be evident to those knowledgeable in the art, the transmission of this invention may embody interconnection with various conventional drive components to effect either an increase or reduction of an output shaft rotation and to gain various output torque characteristics. This is indicated, for example, by the dash outline of a gear 50 engaging gear 51 to transmit a further reduction. Addition of a reverse idler 52, will constitute an automotive transmission unit with integral graduated engagement, engine idling and reverse rotation means.

It is to be understood that the foregoing description and accompanying drawings describe and illustrate a preferred embodiment of the transmission of this invention and that obvious modifications which may be made in the shape and arrangement of the parts thereof come within the scope of the appended claims.

What is claimed is:

1. An automatic variable speed transmission comprising a housing containing a lubricating medium and having axially opposed pairs of conical discs on parallel driving and driven shafts and a loosely pin-jointed link chain for transmitting torque between said discs, the link members of said chain having apertures in rocking bearing contact with the pins and having traction members on extended pin end portions for engaging the discs, said chain being in transversely compressed traction therebetween, said traction members having coacting edge portion holding them in alignment with each other and having an internally conical traction engagement surface adapted to collect and wedge the lubricating medium between the traction member and disc engagement surfaces, one disc of each opposed pair being axially movable relative to the other and having torque responsive means adapted to automatically vary the chain engagement pitch diameter and disc traction pressure by moving the discs in response to varying driving and driven shaft torques, said chain initially being out of full engagement contact with one of said disc pairs when rotation is started, to permit a graduated, wedged lubricant engagement therewith.

2. The automatic transmission to claim 1 in which the link members of the chain comprise link portions having pin bearing apertures substantially larger in internal diameter than the diameter of the pins to permit an internally tangential rocking bearing contact therewith.

3. The automatic transmission of claim 2 in which said larger pin bearing aperture comprise a clearance space for transverse self-alignment of each pin and traction member assembly independently of the chain alignment therewith.

4. The automatic transmission of claim 1 in which one pair of discs is initially in wedged traction with the chain and the other pair of discs is held substantially free of contact therewith when starting under load.

5. The automatic transmission of claim 1 in which power applied to the discs of one shaft initially engages the chain with a torque responsive axial pressure and gradually tightens the chain into tensionally wedged contact with the discs of the other shaft.

6. The automatic transmission of claim 5 wherein the limited chain contact with said other shaft constitutes an engine idling and neutral drive position.

7. The automatic transmission of claim 1 in which the chain length initially is greater than required for equally wedged engagement with both pairs of drive discs.

8. The automatic transmission of claim 1 wherein the back portions of the movable disc members are recessed to contain cam actuated balls and ball reaction races keyed to the driving and driven shafts.

9. The automatic transmission of claim 1 wherein the chain traction members comprise respectively an internally conical working face, side edge portions for coacting alignment with edge portions of adjacent traction members, and axially tapered hub portions for attachment to the pin members.

* * * * *